June 12, 1956 L. L. THOMPSON 2,750,043
VIBRATOR SCREENS FOR SCREENING ROTARY DRILLING MUD
Filed March 21, 1952 3 Sheets-Sheet 1
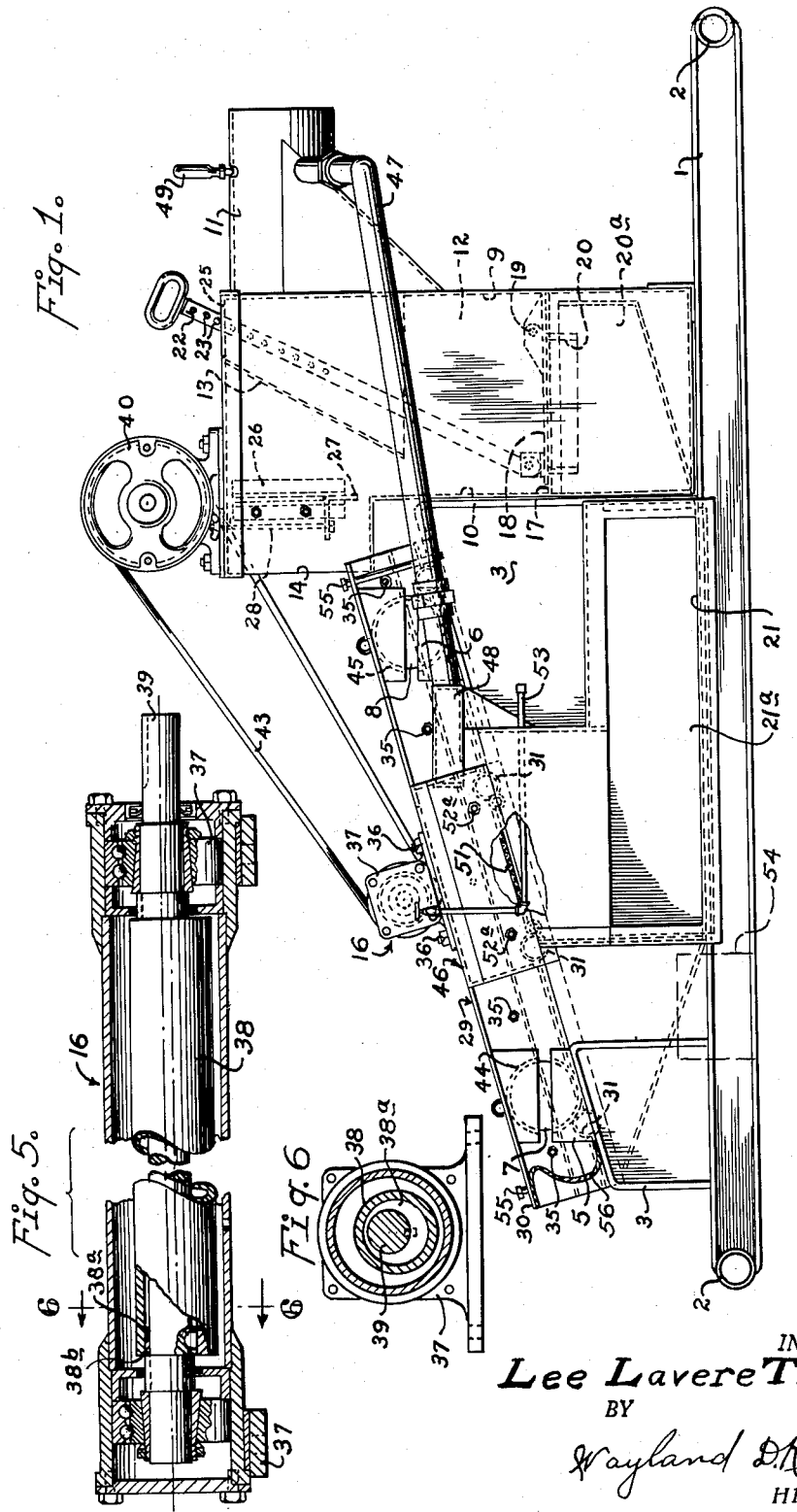
INVENTOR.
Lee Lavere Thompson
BY
Wayland D. Keith
HIS AGENT June 12, 1956 L. L. THOMPSON 2,750,043
VIBRATOR SCREENS FOR SCREENING ROTARY DRILLING MUD
Filed March 21, 1952 3 Sheets-Sheet 2
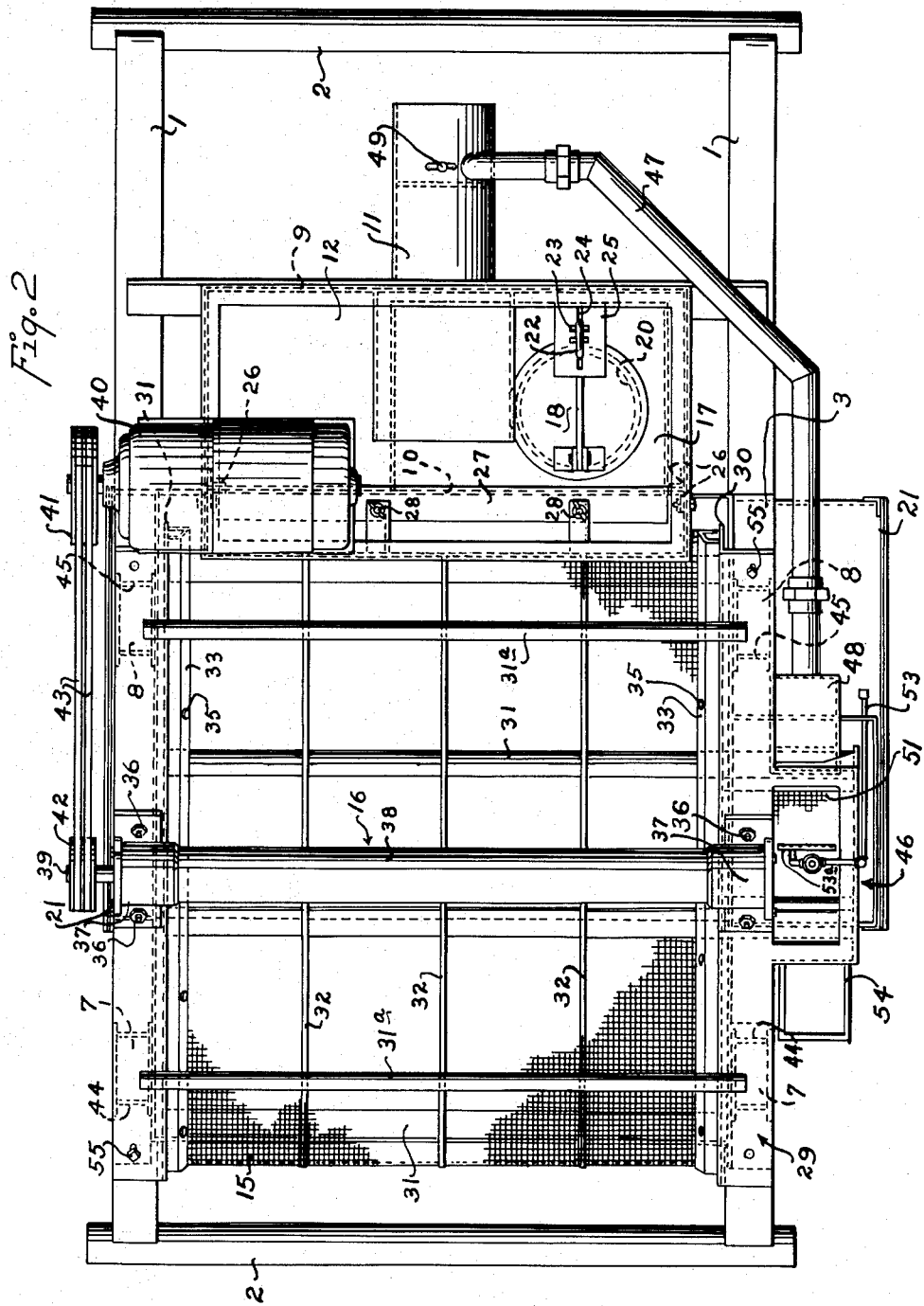
INVENTOR.
Lee Lavere Thompson
BY
Wayland D. Keith
HIS AGENT June 12, 1956 L. L. THOMPSON 2,750,043
VIBRATOR SCREENS FOR SCREENING ROTARY DRILLING MUD
Filed March 21, 1952 3 Sheets-Sheet 3
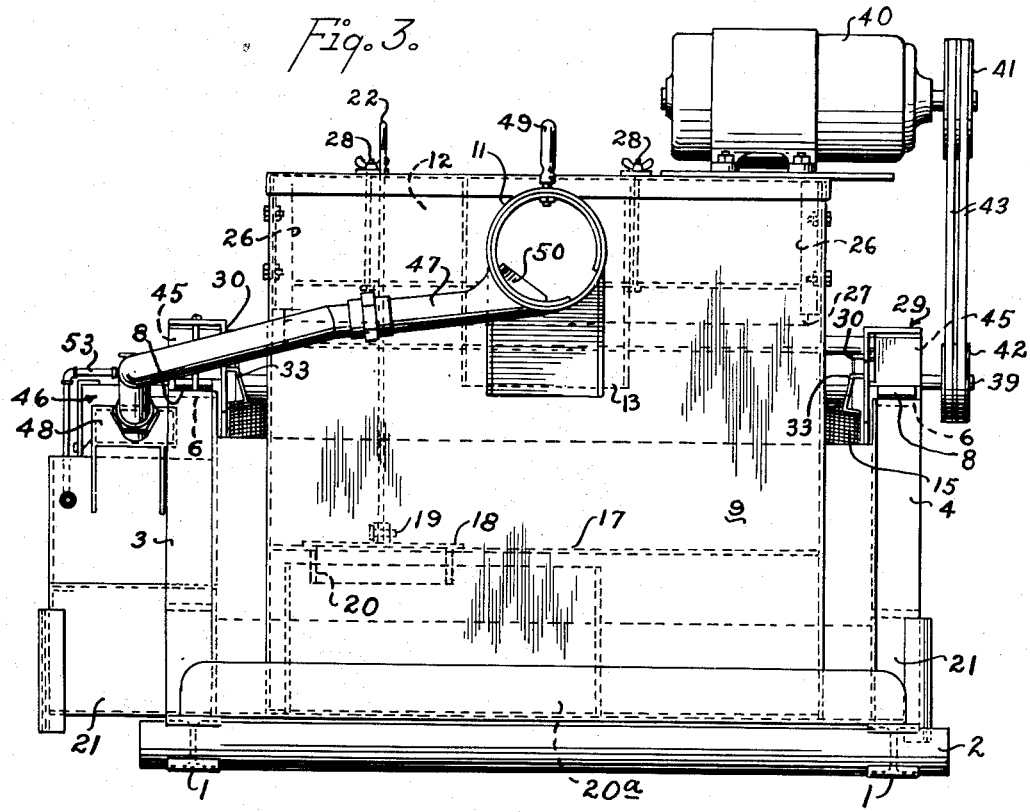
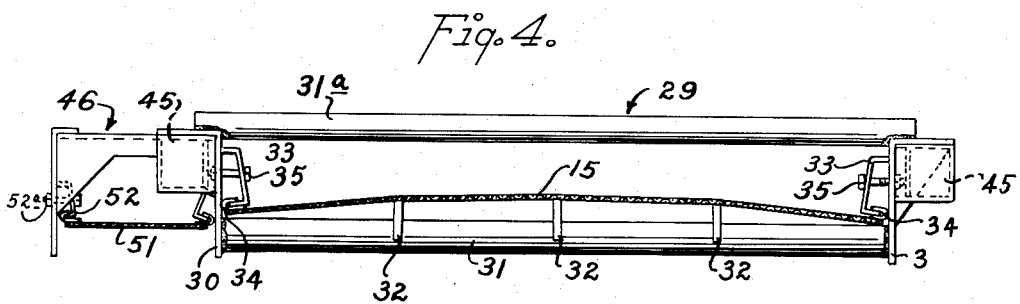
INVENTOR.
Lee Lavere Thompson
BY
Wayland D. Keith
HIS AGENT

United States Patent Office 2,750,043
Patented June 12, 1956

2,750,043

VIBRATOR SCREENS FOR SCREENING ROTARY DRILLING MUD

Lee Lavere Thompson, Iowa Park, Tex.

Application March 21, 1952, Serial No. 277,751

2 Claims. (Cl. 210—149)

This invention relates to improvements in vibrators and more particularly mud vibrators for rotary well drilling apparatus. Various vibrators have been proposed heretofore, but these for the most part lacked the flexibility of presenting an efficient vibrator for separating shale, rocks, sand, and other earth solids from the drilling mud, which is used as a vehicle for circulating through the drill stem and up through the annular space between the drill stem and the wall of the well to bring the earth cuttings to the top of the well, and to "mud-up" and seal off the walls of the well to prevent caving of the well and to prevent encroachment of fluids into or out of the bore hole of the well.

This device is so constructed as to separate and remove the solids from the drilling fluid and divert the drilling fluid back into a channel for reuse while directing the earth solids outward to prevent the clogging of the drill pipe and the like.

An object of this invention is to provide a vibrator having an angularly disposed screen that will separate solids from drilling mud in a continuous manner.

Another object of this invention is to provide a vibrating screen wherein the vibration is imparted to the screen by an eccentrically unbalanced shaft mounted thereon that is rotated at a relatively high speed so as to present high frequency vibration that will sift or separate the mud from the earth solids in a continuous manner.

Still another object of this invention is to provide a vibrator screen that is resiliently mounted on rubber discs so when the screen is vibrated at a high frequency, as by rotating an unbalanced shaft, the rubber disc elements will rotate within their mounting sockets, to evenly distribute the wear thereon.

A still further object of the invention is to provide a vibrator screen for separating a greater portion of the solids from the drilling mud, and at the same time diverting a proportionate amount of the solids into a sample device where they are washed free of drilling mud, and directed into a sample container for inspection.

With the foregoing objects in mind, reference is to be had to the accompanying drawings, in which:

Fig. 1 is a side elevational view of the device embodying the invention, with parts broken away and shown in section to illustrate the details of construction;

Fig. 2 is a top plan view of the device showing the relative positions of the vibrating screen and the auxiliary vibrator, which operate in unison, so that the auxiliary screen receives a proportionate amount of solids from the drilling mud;

Fig. 3 is an end elevational view showing the inlet end of the device;

Fig. 4 is an end elevational view of the screen frame unit, including an auxiliary screen, which unit is shown to be removed from the main frame portion, and shows the screw means for tightening the screen members;

Fig. 5 is an elevational view, partly in section, with parts broken away and shortened to show details of construction of the eccentric vibrator shaft; and Fig. 6 is a sectional view taken on the line 6—6 of Fig. 5, looking in the direction indicated by the arrows.

With more detailed reference to the drawing, the numeral 1 designates a pair of sills, which are preferably formed of structural members, such as H beam or the like, and which have tubular cross members 2 welded at the respective ends thereof, to form a rigid frame. Side members 3 and 4 rise from the sill members 1 and have semi-cylindrical, concave sockets 5 and 6 mounted on the upper side of the respective side frame members 3 and 4, so as to receive resilient disc members 7 and 8, as will best be seen in Fig. 1. The side members 3 and 4 are closed at their rearward ends by walls 9 and 10, to form an inlet compartment. An inlet pipe 11 directs mud into the compartment 12, which mud is deflected downward by deflector plate 13. The upstanding sides 14 of the compartment 12 extend outward over screen 15 and are spaced apart so as to form an opening therebetween for directing mud outward onto the screen 15, which screen 15 is vibrated by a vibrator unit which is generally designated at 16.

The compartment 12 has a bottom 17 therein, which has a closure 18 hinged at 19 to enable the lower portion of the compartment to be opened to by-pass unseparated mud and solids through passages 20 and 20a into outlet 21. A hand lever 22 may be operated to raise and lower the closure 18, which hand lever is provided with cross pins 23 which engage in a slot 24 in outstanding lug 25 on the wall 9. In this manner the closure may be completely opened, or opened to any desired degree by manipulation of the lever 22.

Within the opening 14, and secured to each side thereof are pairs of guide members 26, which members guide leveling gate 27 in a vertical path by manipulation of screws 28. The mud flowing outward beneath the leveling gate 27 is spread across the width of the screen member 15 so that the entire area of the screen operates on the mud and drilling fluid passing thereover. The screen 15 is supported within a frame which is generally designated by the numeral 29, which screen frame has side members 30 and tubular brace members 31 and 31a which form a rigid frame. Longitudinal screen support members 32 extend from end to end of the side members 30 that form the screen frame, and are secured to transverse tubular support members 31, as by welding or the like. The screen 15 is attachably secured to side members 30 by means of tension clamps 33, which interengage the screen 15, by a hook 34 on each of said tension clamps 33. The tension clamps 33 each have bolts 35 passing therethrough, which enables the screen 15 to be tightened by screwing nuts on the respective bolts, which draw the screen toward the side members of the screen frame.

The vibrator unit 16 is mounted on anti-friction bearings 37, which bearings are bolted to the screen frame 29 intermediate the length thereof. A concentric shaft 39 passes through the vibrator unit 16, which shaft has an eccentrically mounted tubular member 38 secured thereto adjacent the bearings 37. A collar 38a is interposed between the concentric shaft 39 and the eccentrically mounted tubular member 38, which collar is secured to said tubular member, as by welding at 38b, Fig. 5, so upon rotation of the shaft 39 at high speed, the bending moments due to the unbalanced load will be transferred from the eccentric member 38 to the concentric shaft 39 at a point adjacent the bearings, which will relieve the intermediate point of the concentric shaft of undue strain, as the lateral flexing of eccentric tubular member 38 will be independent of the concentric shaft 39 at its mediate portion, thereby enabling the use of a much smaller shaft, and also enabling the eccentric member to be removed from and replaced onto the shaft, thus materially reducing the initial cost, as well as the subsequent cost, while at the same time giving superior effectiveness, as the greater portion of the intermediate length of the concentric shaft is relieved of lateral strain, as the load is transmitted from the eccentrically mounted tubular member 38 to a point on the concentric shaft 39 which is in close proximity to the bearings 37.

With the shaft 39 thus eccentrically loaded, the tubular eccentric member 38 is sufficiently off-center that, when the shaft 39 is rotated at a relatively high speed by motor 40 driving through pulleys 41–42 and belts 43, a vibratory motion is set up on the screen frame 29, which will sift the mud through screen 15 into a compartment 21a therebelow to be discharged out through discharge opening 21, while the solids will be directed downwardly along the inclined screen to be discharged off the lower end thereof.

The screen frame 29 has sockets 44 and 45 secured thereto which sockets are adapted to register in complementary relation with sockets 5 and 6 of the respective side members 3 and 4, so as to resiliently support the screen frame 29 on the respective resilient discs 7 and 8.

Mounted on the side of the screen frame 29 is an auxiliary screen frame or sample separating device 46, which is similar in construction to the frame 29, but on a smaller scale. An inlet pipe 47 is utilized to divert a portion of the drilling fluid containing the earth solids from inlet pipe 11 into a spreading trough 48. The proportion of the drilling fluid with the earth solids entrained therein, that is directed onto the trough 48 is determined by the setting of a valve 49, to which a diverter plate 50 is attached, for diverting this proportionate amount of drilling fluid onto the sample separating screen frame which has a screen 51 in the bottom thereof. The screen 51 is held taut in the frame 46 by means of tension clamps 52. This sample receiving screen 46 is rigidly attached to screen frame 29 and is vibrated in unison therewith, without having to provide additional power connections to operate the auxiliary screen.

A water pipe 53, which has a perforate portion 53a, is provided and is positioned a spaced distance above screen member 51 so as to wash the mud from the earth solids, which solids may be directed into a container designated at 54 and which is positioned below the lower end of screen 51. The solids separated by the auxiliary screen and discharged into a container may thus be set aside for inspection and comparison with other formations.

Bolts 55 may be provided at the diagonal corners of the screen frame 29 so as to retain the screen frame 29 against accidental displacement. A ground cable 56 is provided intermediate the screen frame 29 and one of the side members 3 or 4, of the base frame, so as to ground the static electricity from the screen frame which is mounted on resilient rubber-like discs 7 and 8, to the main frame comprising sills 1 and tubular cross members 2. By having the screen frame 29 mounted on the resilient discs 7 and 8 in sockets 5 and 6, which resilient members 7 and 8 are received by the complementary sockets 44 and 45 respectively. In this manner the resilient, rubber-like discs will roll within the sockets, so that the wear thereon will be distributed evenly.

With the eccentric member 16 rotating at high speed to vibrate the screen frame 29, the solids entrained in the drilling fluid will readily find their way downward along the inclined screen 15 to be discharged off the lower end thereof, and the mud which has been screened free of the earth solids will be directed downward below the screen 15 and outward through discharge opening 21, to be recirculated.

It will be readily apparent that the screen frame 29 can be readily removed so that the resilient discs, which are usually made of rubber or synthetic rubber, may be removed when they become worn and new discs substituted, or, when necessary, the screen member 15 may be removed and a new screen substituted therefor. Furthermore, the auxiliary screen unit is so constructed as to take a proportionate sample of the drilling fluid as the drilling progresses.

If it is desired to use bulk or filling material, such as cotton seed hulls, sawdust, or other fibrous material, the closure 18 may be opened a regulated amount so as to divert the desired proportion of the drilling fluid and the bulk material through the by-pass opening 20 into outlet passage 21 without clogging the screen 15 with such fibrous material.

While the invention has been described and illustrated in some detail of one embodiment thereof, it is to be understood that certain changes may be made in the minor details of construction and adaptations made to particular installations without departing from the spirit of the invention as claimed.

Having thus described the invention, what is claimed is:

1. In a vibrating sample screening device for removing certain insoluble solids from drilling mud, which sample screening device is adapted to attach to a drilling mud vibrator screening apparatus having a rectangular base, a resiliently mounted inclined screen covered frame mounted above said rectangular base, power means for vibrating said screen covered frame, said sample screening device having an inclined screen, which screen is operatively connected to the screen covered frame of said drilling mud vibrator apparatus, a conduit leading from a source of drilling mud for diverting a proportionate amount of drilling mud to the upper end of said screen of said sample screening device, and a receptacle for receiving a representative sample of said solids from said drilling mud.

2. In a vibrating sample screening device for removing certain insoluble solids from drilling mud, which sample screening device is adapted to attach to a drilling mud vibrator screening apparatus having a rectangular base, a resiliently mounted inclined screen covered frame mounted above said rectangular base, power means for vibrating said screen covered frame, said sample screening device having an inclined screen, which screen is operatively connected to the screen covered frame of said drilling mud vibrator apparatus, a conduit leading from a source of drilling mud for diverting a proportionate amount of drilling mud to the upper end of said screen of said sample screening device, a receptacle for receiving a representative sample of said solids screened from said drilling mud, and a transversely disposed conduit having a series of apertures formed therein secured to said sample screening device for directing a washing fluid onto said screen of said sample screening device for washing mud from said solids.

References Cited in the file of this patent

UNITED STATES PATENTS

| | | |
|---|---|---|
| 1,191,227 | Ramsay | July 18, 1916 |
| 2,090,767 | Sayers et al. | Aug. 24, 1937 |
| 2,203,405 | Clicquennoi | June 4, 1940 |
| 2,329,295 | Reagan | Sept. 14, 1943 |
| 2,408,558 | Hutchison | Oct. 1, 1946 |
| 2,446,293 | Minyard | Aug. 3, 1948 |
| 2,651,419 | Overstrom et al. | Sept. 8, 1953 |

FOREIGN PATENTS

| | | |
|---|---|---|
| 730,905 | France | May 23, 1932 |